UNITED STATES PATENT OFFICE.

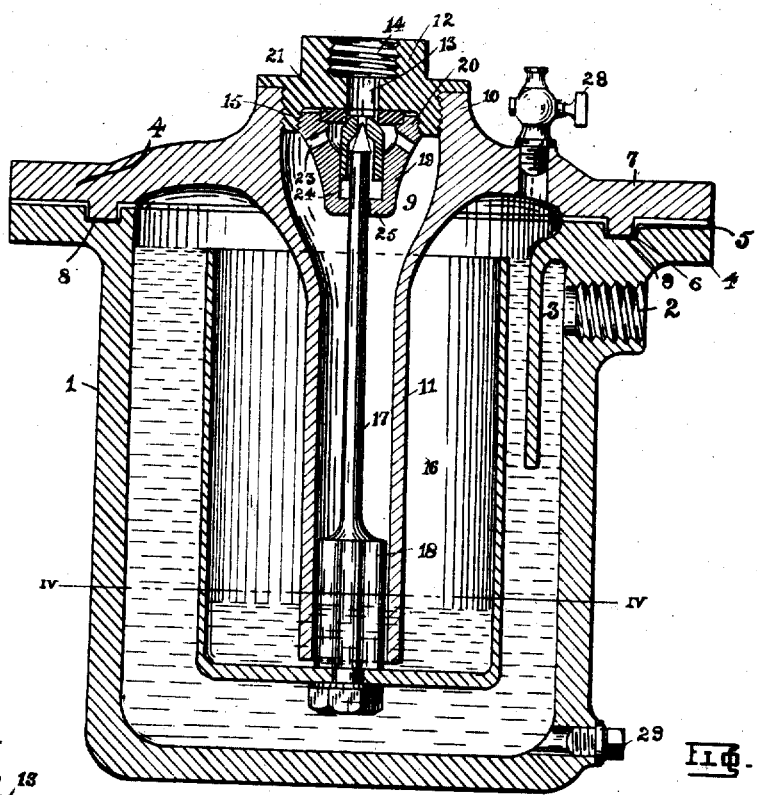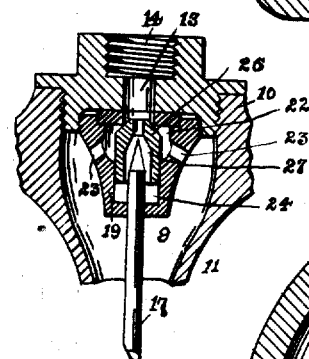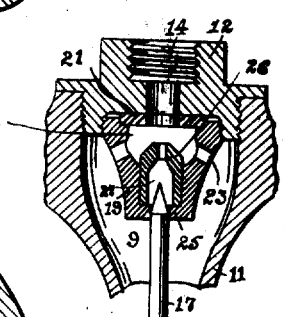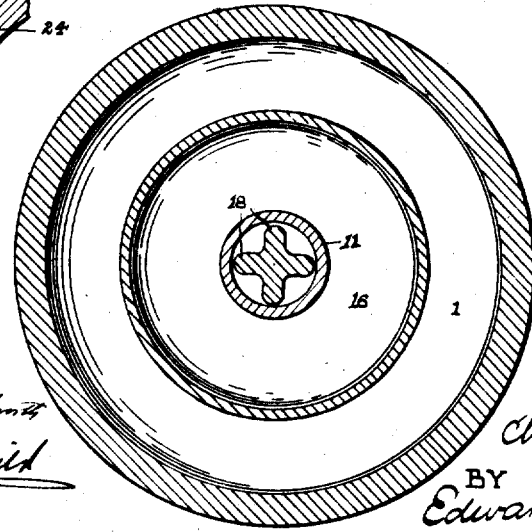

CHARLES E. VANCE, OF PITTSBURG, PENNSYLVANIA.

STEAM-TRAP.

No. 900,329.

Specification of Letters Patent.

Patented Oct. 6, 1908.

Application filed November 30, 1907. Serial No. 404,557.

*To all whom it may concern:*

Be it known that I, CHARLES E. VANCE, a citizen of the United States, and residing in the city of Pittsburg, in the county of Allegheny and State of Pennsylvania, have invented or discovered new and useful Improvements in Steam-Traps, of which the following is a specification.

My invention consists in certain new and useful improvements in traps for the removal of water from steam, and provides means whereby the contents of the trap, when full, are automatically discharged by the action of my improved valve mechanism, and, after said discharge the valve automatically closes and remains closed until the trap again becomes filled with water.

The form of valve mechanism is novel and of extreme simplicity, and, therefore both inexpensive and unlikely to get out of order.

In the accompanying drawings, Figure 1 is a vertical section of my trap showing the valve mechanism closed; Fig. 2 is a broken vertical section showing the auxiliary valve open and the main valve closed; Fig. 3 is a similar view showing both valves open, and Fig. 4 is a cross section along the line IV—IV in Fig. 1.

The following is a detailed description of the drawings:—

1 is the casing of the trap which is preferably cast of metal and is connected to the steam line, not shown, by means of port 2 located in the wall of said casing, preferably near the top thereof. Extending downwardly within the casting in front of port 2 I prefer to provide a baffle 3 which tends to throw the steam entering port 2 downwardly to the bottom of the casing 1. A suitable valve, not shown, is provided to control the entrance of steam through 2. The top edge of casing 1 is flanged circumferentially as at 4 and said flange is provided on its upper face with a groove 5 into which fits the lip 6 of the cover 7. A suitable packing ring, 8, of suitable material may be placed in groove 5 to maintain a tight joint between cover 7 and the casing 1. Any suitable means, not shown, may be used to attach the cover to the casing.

In the center of cover 7 is the annular orifice 9, the material of the cover being flanged up vertically as at 10 to form an exterior collar on said cover. Integral with said cover, or attached thereto, is downwardly extending tube 11 whose central bore is concentric with orifice 9 but of less diameter than said orifice into which its upper extremity gradually expands. I prefer to make the cover 7 of cast metal, forming the tube 11 integral therewith in the same operation.

12 is a plug adapted to engage the threaded portion of orifice 9 and provided with a central bore 13 whose outer portion is of greater diameter and threaded, as at 14, to enable a discharge pipe, not shown, to be attached thereto. The lower portion of said bore 13 is countersunk and threaded as at 15.

16 is a bucket seated in casing 1 and adapted to rise and fall therein as will be explained hereafter. 17 is a stem rigidly attached at its lower end to the bucket 16 and extending upwardly within tube 11. The lower portion of said stem 17 is provided with radial extensions or wings, 18—18, which obtain a bearing against the wall of tube 11 and at the same time do not materially obstruct the free passage of water up tube 11. The upper portion of said stem 17 is preferably cylindrical and the end thereof is preferably tapered substantially to a point, as shown in Fig. 1.

19 is a downwardly depending member of an exterior contour substantially of a frustrate cone shape, its cylindrical portion 20 being threaded to engage the threads 15 in the bore 13.

21 is a packing ring of brass or other suitable material adapted to be held between member 19 and plug 12, and having a central bore of equal diameter to that of the central portion of bore 13.

22 is a chamber within member 19 into which lead lateral ports 23—23 extending through the wall of member 19 and communicating with the interior of orifice 9. The central bore 24 of member 19 is contracted at its lower end by means of annular flange 25 to loosely fit the stem 17 which extends upwardly into the interior of said member 19.

26 is a bonnet adapted to be seated in the bore 24 of member 19 and to engage and close, when in its elevated position, the bore of packing ring 21, thus preventing the passage of water out of the orifice 9 in the cover 7. The central bore 27 of bonnet 26 is of sufficient diameter to permit said bonnet to ride loosely on the end of stem 17, the upper portion of said bore 27 being contracted so as to be closed by the pointed extremity of stem 17, as shown in Fig. 1.

28 is a pet cock to permit the expulsion of the air contained in the trap and 29 is a blow out plug adjacent to the bottom of casing 1 to enable the sediment collecting therein to be blown out when desired.

The operation of my invention is as follows:—The steam is admitted through port 2, the pet cock 28 being left open for a moment to permit the escape of the air. The steam and water entering through port 2 are thrown to the bottom of casing 1 by means of baffle 3. The admission of the steam and water floats bucket 16 upwardly until the stem 17 forces the bonnet 26 into close engagement with the packing ring 21 thus closing the bore of said packing ring and the bore of the plug 12. The pointed end of stem 17 closes the bore 27 of bonnet 26, the parts thus assuming the relative positions shown in Fig. 1 and all access through the orifice 9 being thus cut off. The casing 1 gradually fills with water deposited by the incoming steam until said water overflows the edge of the bucket 16. As said bucket fills with water its buoyancy is thus overcome and it sinks, drawing down with it the stem 17 thus disengaging the pointed end of said stem 17 from the bore 27 of the bonnet 26, as shown in Fig. 2. By means of the passage of steam through the bore of bonnet 26, the pressure is equalized on each end of said bonnet permitting the same to drop within member 19 into the position shown in Fig. 3, thus opening the passage through packing ring 21 and plug 12. The pressure within the casing now drives the water in the bucket 16 up through tube 11 into orifice 9, ports 23—23 into the interior of member 19 and thence through the bores of the packing ring 21 and plug 12 to the discharge pipe, not shown. As soon as enough water is exhausted from the bucket to restore its buoyancy, the bucket again rises in the casing 1 until the pointed end of stem 17 raises the bonnet 26 into the position shown in Fig. 1, thus completely closing the discharge openings as shown in Fig. 1. It is thus evident that as often as sufficient water overflows into bucket 16 to overcome its buoyancy, the same will be automatically discharged and the discharge ports then again closed for a repetition of the operation.

Among the advantages of my improved trap may be named its extreme simplicity and the limited number of parts used, thus avoiding the greater portion of the original cost of the well known types of steam traps now in use.

One great item of expense in steam trap manufacture is the number of parts which require to be machined. In the case of my trap this machine work is reduced to a minimum thus omitting these expensive features. The features which operate to cheapen the cost of manufacture of my trap also render it more durable and less likely to get out of order.

What I desire to claim is:—

1. In a steam-trap, the combination with a casing, of a cover secured thereto having a discharge orifice therein, a hollow plug having a valve-seat, said plug also having an upper portion secured to the cover at said orifice and a lower portion depending therefrom, the upper part of said depending portion having ports, a discharge-tube carried by said cover adapted to communicate with the discharge orifice through said ports and depending into the trap-casing, a vertically-reciprocating valve in the depending portion of said plug having a vertical port therethrough, a valve-member adapted, when moved upward, to close the port through said valve and raise the valve against said valve-seat to shut off passage through said discharge-orifice, means in said casing controlled by the water-level therein for actuating said valve-member, and an inlet connection for said casing.

2. In a steam-trap, a casing, a cover attachable thereto and having a discharge-orifice and carrying a depending tube at the discharge-orifice, a plug screwed into the cover at the discharge-orifice thereof and having a lower recessed, internally-threaded portion, a hollow member screwed into said recessed portion and having a contracted lower portion and an upper, expanded, ported portion, a vertically-reciprocating valve disposed within said member and filling said contracted portion thereof, and having a vertical port therethrough, and a bucket disposed within the casing and carrying a pointed stem adapted, upon upward movement of the bucket, to close passage through said valve and reciprocate the same upward to shut off passage through said discharge orifice.

Signed at Pittsburg, Pa., this 29 day of November 1907.

CHARLES E. VANCE.

Witnesses:
J. H. HARRISON,
EDWARD A. LAWRENCE.